Patented Apr. 14, 1942

2,279,436

UNITED STATES PATENT OFFICE 2,279,436

PROCESS FOR POLYMERIZING VINYL COMPOUNDS

Herbert Berg, Burghausen, Germany, assignor to Chemische Forschungsgesellschaft, m. b. H., Bavaria, Germany No Drawing. Application January 13, 1936, Serial No. 58,873. In Germany January 19, 1935

4 Claims. (Cl. 260—85)

For the polymerization of unsaturated compounds it has been found especially advantageous to combine a polymerizable unsaturated compound with a watery solution containing dispersing substances, which do not act saponifyingly and to submit the dispersion produced thereby by stirring, shaking, blowing through gases, cooking or similarly acting methods, to any kind of polymerizing influence.

A typical example of a dispersing means which is advantageously used in the sense of this invention is methylcellulose which is known to be soluble in cold water but to separate itself more or less from the water when heated. The products of esters, acetals or ethers of polyvinyl alcohol partially hydrolized up to their solubility in water are very effective, even when added in minute quantities. For instance, a partially acetylated polyvinyl alcohol with a saponification number between 30 and 100 has an excellent effect. Further dispersing means are polyvinyl ethers, which are more or less soluble in water, suitably saponified esters, acetals and ethers of polyvinyl alcohol and especially such saponification products of complicated polymerizations as for example vinylesters which have been polymerized in the presence of larger or smaller quantities of aldehydes or in drying fatty oils, also such modifications of polyvinyl alcohol itself as show corresponding dispersing properties, condensation products of aldehydes with phenols, carbamides, etc., which still retain a corresponding solubility in water and whose colloidal solubility in water is stabilized to a corresponding degree and so on. Also sterines such as cholesterin, phytosterins and saponins come in question. Also salts which act suitably in a watery solution, for example, suitable aluminium acetates, etc. Also pectins and gelatine, decomposition products of starch, etc., may be used alone or in combination with other dispersing materials according to the invention. On the whole, modifications of the effect in any desired direction and to any exact degree may be obtained by combinations made to suit each individual case. The effect of the dispersing means can be further varied to a great extent by the admixture to the watery solution of suitable amounts of salts or organic substances such as tannin, sugars, alcohols, glycerine, glycols, glyoxan, ketones, aldehydes, phenols, etc. In especial cases, it is also advantageous to dispense in the watery solution hydrocarbons, oils, etc., especially such as do not dissolve the unsaturated substance to be polymerized and the product of polymerization. A further aid is the suspension of ground solid substances or of such as have been pulverized at a higher temperature, especially of such as are water repelling, for instance, resin, artificial resins, Bakelite, high-melting paraffins, fatty acids, waxes and similar matters, also of kaolin, ground shale, magnesia, chalk.

Polymerization in a dispersion of one of the above mentioned watery solutions may be used to great advantage for polymerizable unsaturated compounds of all kinds, for instance for vinylester, acrylic acid, methacrylic acid, itaconic acid and the derivatives of these acids, styrols, butadienes, methylvinylketone, chloroprene, drying oils, etc. Furthermore for the manufacture of mixed polymerizates of various unsaturated compounds, for example, vinyl acetate and vinylchloride or acrylic acid methylester and vinylacetate, or vinylester and chloroprene, etc. Semipolymerizates, for instance, an unsaturated ester prepolymerized to glycerine consistency and the like or solutions of such semi-polymerizates can be converted into especially valuable full polymerizates by the invented method of dispersion. This new method also facilitates the especially advantageous polymerization of volatile unsaturated compounds, e. g., of vinylchloride. For this especial purpose, for instance solutions of vinylchloride in unsaturated or saturated organic solvents are used. Evaporation of the vinylchloride during the process is prevented by filling the gas room above the dispersion to be polymerized with vinylchloride, either at normal or at increased pressure.

The dispersion of the materials to be polymerized and the qualities of the final products may be varied to a great extent and suited to certain purposes by admixtures. First, one may add to the unsaturated body, semi or full polymerizate of the same or of a different kind, for example to vinylacetate one may add polymerized vinylacetate or polymerized ester of acrylic acid. Furthermore, the admixture of other highmolecular substances in dissolved or suspended form produces valuable synthetic materials, for example, cellulose derivates, condensation products of aldehydes with phenols or carbamides of polybasic acids with alcohols or glycols, natural and synthetic resins, etc. According to the new method, an especial kind of polymerizate may be obtained from combinations of vinyl compounds with drying oils, especially of their low disperse phase. The dispersion of the materials to be polymerized and the qualities of the final products can be further suitably modified by the admixture of softening means, colors, filling materials, pigments, etc. Fibrous fillings such as asbestos, cellulose, wool and the like—if they are suitably short fibred—produce valuable materials. The reaction of the materials to be polymerized may be further influenced in the desired direction by the addition of solvents or other fluids, for instance, of alcohols, glycerine, glycols, ketones, aldehydes, phenols, esters, hydrocarbons and their products of chlorination. Moreover, one may add the water repelling substances—mentioned above as admixtures to the watery solution—to the material to be dispersed instead of or in addition to the above mentioned admixtures.

It has been further found that the finishing of the polymerizate in watery solutions containing non-saponifying dispersing means offers especial advantages if one does not add the dispersing means to the monomeric composition substances for the desired polymerizate but rather to already partially or more or less fully polymerized products of unsaturated organic compounds.

By this method an especially small amount of the dispersing means suffices to produce polymerizates of a high degree of purity and an especial clearness of solubility in any solvent among other things, this step allowing of many modifications.

The dispersions according to this invention offer special advantages in all methods of polymerization, whether the polymerization is carried out by heating, by exposure to light or other irradiation or by a combination of such influences in the presence or the absence of appropriate catalysers or other admixtures and at normal, increased or decreased pressure.

To the above mentioned possibilities of modification must be added such caused by the various kinds of polymerization. For instance, the less polymerization catalyser is used or the more one replaces the catalysing promotion of the polymerization by exposure to light or other irradiation, the more highly polymerized and the more viscous are the products obtained. The proportions of the amount of the watery disperser to that of the substance to be polymerized has a great influence, not only on the behaviour of the dispersion, but also on the characteristics of the final products. By such variations in combination with those mentioned above and even while keeping the same degree of polymerization and of viscosity one can not only determine the degree of polymerization as desired and with certainty, but one can also change the characteristics of the products according to desire and thus create quite novel synthetic materials of high value. The new process makes possible, for example, the production of polyvinylacetates which are still meltable but distinguish themselves from those produced thus far by having a far higher melting point.

*Example I*

100 weight units of a 0.8% water solution of methylcellulose was mixed by stirring with 300 units of vinylacetate to which 0.03 unit of benzoyl peroxide had been added. The dispersion thus obtained was cooked, being stirred constantly, until the vapors rising in the superimposed reflux condenser proved to be free of vinylacetate which was achieved in a few hours. The result was a suspension of fine-grained polyvinylacetate which could be emptied from the reaction vessel without having the polymerizate settle on the wall-surface. The polyvinylacetate was filtered from the suspension, washed with water and dried. These procedures took an astonishingly short time and were satisfactory in every respect. The drying can be done at high temperature for example, 80–90° C., without diminishing the average fineness in grain. The mother liquor which still contained methylcellulose could be used again for a new batch.

The polyvinylacetate thus procured in a practically theoretical yield formed a noncaking snow-white powder similar in appearance to a crystalline substance. It proved to be unmeltable and especially high-polymeric, and its saponification produced correspondingly high-polymeric polyvinyl alcohol, respectively, especially high-polymeric derivates such as acetals etc. with other conversions. The valuable qualities of this novel polyvinylacetate corresponded to its high-polymeric characteristics. It was entirely free of the disturbing quality of the after-polymerization and showed the typical solubility properties of the cellulose esters, namely, a phase of swelling preceding the real solution in organic solvents. Pressed articles of the new polymerized vinylacetate proved to be much more heat-proof than such made of the high-molecular products made according to the methods heretofore used.

The size of the grains of the produced polymerizate may be varied by different means, for instance by varying the concentration of methylcellulose or by further admixture of monomeric polymerisable compounds to the polymerization mixture in which powder or grains of the polymerizate have already been precipitated, and by other means.

Should the dissolving of a polymerizate which has not been thoroughly freed of methylcellulose cause a turbidity of the solvent for example, alcohol, acetone, ethyl acetate, butyl acetate, etc.—but not in the case of benzol, toluol and the like—the particles of methylcellulose can easily be filtered off. Besides, for instance in the case of alcohol or acetone solutions, the formation of such turbidity can be prevented by the addition of a suitable quantity of water or of softeners or similarly acting solvents. By this method, one obtains entirely clear solutions, and from the latter water-clear films.

*Example II*

100 weight units of a 10% water solution of methylcellulose and 300 units of vinylacetate were shaken in a container of uviol glass and irradiated by ultraviolet light, whereby the dispersion was converted to a suspension of fine grained polyvinylacetate which was easily filtered and washed. The product was a theoretical yield of a non-caking polymerizate which proved to be higher-molecular than the highest polymeric polyvinylacetate obtained thus far by irradiation according to the methods heretofore known.

*Example III*

A mixture of 200 weight units of acrylic acid nitrile, with 100 units of a watery solution containing 0.8% low-polymeric polymerized vinyl ethylether, 0.5% methylcellulose and 1% peroxide of hydrogen was heated with constant stirring with a reflux condenser to a temperature of 70° C. for 2 hours and then cooked until the complete polymerization of the acrylic acid nitrile had taken place. The latter was precipitated in the form of evenly fine-grained powder which was emptied with the watery mother liquor and could easily be filtered and washed. It showed an especially high degree of purity.

Example IV

A mixture of 1000 weight units of vinylacetate, 1000 units of water and 1 unit of benzoyl peroxide is heated to 60–70 C. under constant stirring and polymerized until the viscosity of the semi-polymerizate corresponding to the desired largeness of grain was reached. Then, still stirring vigorously, one gradually adds 0.2 unit of a partially acetylated polyvinylalcohol with a saponification number of about 90 and finishes the polymerization. One thereby obtains in the form of globules which are larger or smaller according to the time of the addition of the dispersing means, a high-polymeric polymerized vinyl acetate which can easily be clearly dissolved in suitable solvents.

Example V

By heating up to a temperature of 70–90° C. under constant stirring, a mixture of 1000 weight units of vinyl acetate, 1000 units of water and 15 units of 30% peroxide of hydrogen is polymerized until the monomeric vinylacetate has largely or completely disappeared. Then the temperature is raised to 100° C. which causes the polymerizate to become viscous. 1 unit of a formaldehyde acetal of polymerized vinyl alcohol, which has been partially saponified to become soluble in water, is added and the mixture is cooled while vigorously stirring. By this method, the polymerizate is produced in a very pure form in the shape of globules or lentils.

Example VI

In the presence of 1 unit of benzoyl peroxide 1000 units of vinyl acetate are heated to 60–70° C. and polymerized until a viscous semi-polymerizate results. Constantly stirred, this latter is let run gradually into a solution of 0.2 unit of an ethyl ether or a butyrate or an acetate of polymerized vinyl alcohol which has been partially saponified until it is soluble in water, in 1000 units of water. Finally the polymerization is completed at a temperature of 70–100° C. and produces especially clear globules of the polymerizate.

The new method which is characterized by its great simplicity makes it possible to control polymerization processes in predetermined ways to to yield exactly graded modifications of a thus far unobtainable variety. For example, polymerized vinyl esters can be invested with the solubility properties of cellulose esters and so on. An especial object of this invention is the manufacture of products, whose degree of polymerization is much higher than was obtainable up to the present, and also the production of certain modifications of the products of decomposition of the indirectly obtanined polymerizates, e. g., polymerized vinyl alcohol, acetals of polymerized vinyl alcohol and their intermediate products. Furthermore, the new method permits a more favorable polymerization and one carried to a higher degree of polymerization of slowly reacting unsaturated compounds. At the same time the process according to the present invention illustrates the first kind of polymerization process to produce a 100% yield of direct solid polymerizate, even without the use of excess pressure. It permits the execution of the polymerization of a dispersion with proportionately small quantities of watery dispersing means. It has made possible for the first time the manufacture of high-polymeric polymerized vinyl acetate in powder form and also insures the powdery polymerizates against caking while they are stored. It makes polymerizates which are completely free of acids and thereby does away with many disadvantages such as the annoying stickiness, the obstinate retention of water, etc. It manufactures products which are not subject to undesired after-polymerization and which are superior to the old kind on account of their high stability in heat.

The process itself has the following advantages. Aside from exceptional cases, one does not need organic solvents which entail losses and other disadvantages. According to this invention, the polymerization takes much less time than heretofore. One saves work because the polymerizates can easily be taken out of the polymerization vessel and a knocking-out from cups and the like is not necessary. This results in further economizing in material. One evades the disadvantages of the old polymerization processes caused by the settling of the polymerizate on the walls of the vessel. Evaporization of any kind is unnecessary and thus the chief cause of after-polymerization is avoided. Clogging of the apparatus is out of the question; thus the works are safeguarded. A further economy lies in the fact that the products do not have to be crushed or ground and yet one obtains synthetic materials which may easily be mixed with fillings, which are easily soluble in solvents and whose globular, powdery or sandlike form permits them to be packed and shipped with great convenience. In case of necessity, one can produce materials whose globules or lentil-like particles have a diameter of 1 cm. or more. In general no isolation and no purification of the products from organic solvents is necessary. The characteristics of this new process insure ease in the filtering and speed in the drying of the polymerizates produced thereby.

While I have specifically described certain preferred embodiments of my invention, it is to be understood that the invention is not to be limited to all of the details hereinbefore described, but may be otherwise varied within the scope of the following claims.

The invention claimed is:

1. A method of polymerizing a compound containing a vinyl group to produce a non-caking, globular product, which comprises dispersing the compound in water, partially polymerizing the compound, adding to the dispersion a partially saponified derivative of a saponifiable polymer of a substance containing the vinyl group in a quantity not exceeding about 0.1% by weight on the said compound, and thereafter continuing the polymerization of said compound.

2. A method of polymerizing a compound containing a vinyl group to produce a non-caking, globular product, which comprises dispersing the compound in water, partially polymerizing the compound, adding to the dispersion a partially saponified vinyl acetate in a quantity not exceeding about 0.02% by weight on the said compound, and thereafter continuing the polymerization of said compound.

3. A method of polymerizing vinyl acetate to produce a non-caking, globular product, which comprises dispersing the compound in water, partially polymerizing the compound, adding to the dispersion a partially saponified vinyl acetate in a quantity not exceeding about 0.02% by weight on the said compound, and thereafter continuing the polymerization of said compound.

4. A method of polymerizing a compound containing a vinyl group to produce a non-caking, globular product, which comprises adding, to a dispersion in water of a partially polymerized compound containing the vinyl group, a partially saponified derivative of a saponifiable polymer of a substance containing the vinyl group in a quantity not exceeding about 0.1% by weight on said compound, and thereafter continuing the polymerization of said compound.

HERBERT BERG